(No Model.)
F. ALBRECHT.
ATTACHMENT FOR CULTIVATORS.
No. 308,455. Patented Nov. 25, 1884.
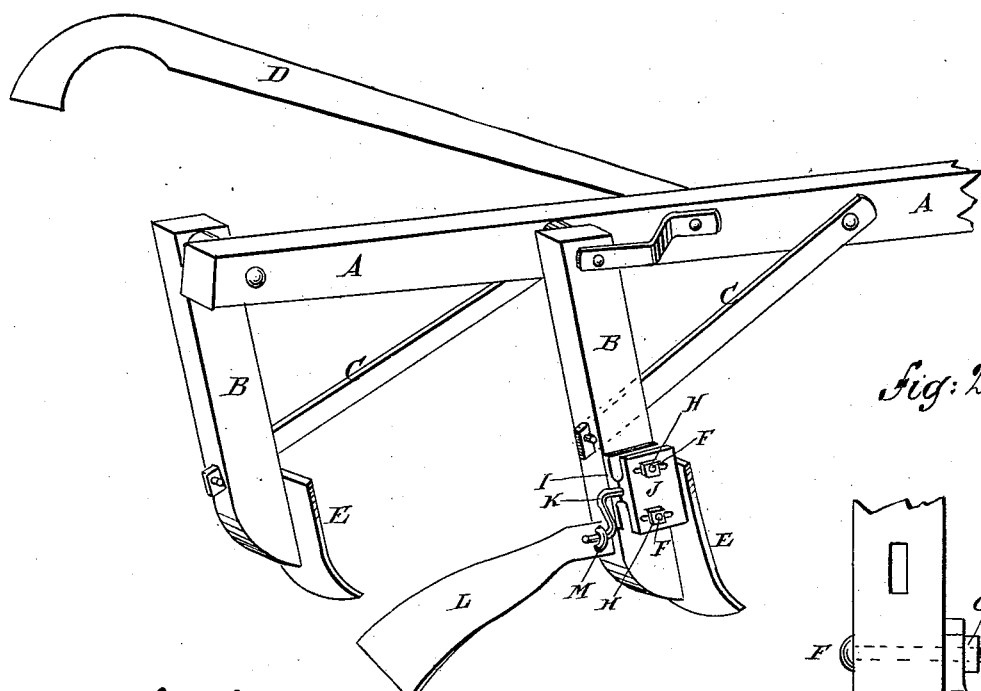
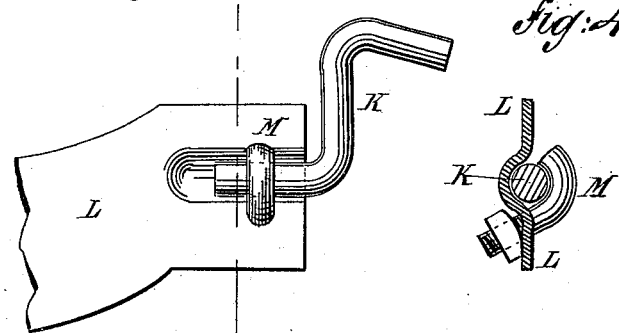
WITNESSES:
INVENTOR:
BY
ATTORNEYS.

United States Patent Office.

FREDERICK ALBRECHT, OF OHIO, ILLINOIS.

ATTACHMENT FOR CULTIVATORS.

SPECIFICATION forming part of Letters Patent No. 308,455, dated November 25, 1884.

Application filed July 22, 1884. (No model.)

*To all whom it may concern:*

Be it known that I, FREDERICK ALBRECHT, of Ohio, Bureau county, Illinois, have invented a new and Improved Attachment for Cultivators, of which the following is a full, clear, and exact description.

Reference is to be had to the accompanying drawings, forming part of this specification, in which similar letters of reference indicate corresponding parts in all the figures.

Figure 1 is a perspective view of a part of a cultivator to which my improvement has been applied. Fig. 2 is a rear elevation of a part of the same, partly in section and part being broken away. Fig. 3 is a side elevation of a part of the attachment. Fig. 4 is a sectional elevation of a part of the same, taken through the line $x\ x$, Fig. 3.

The object of this invention is to provide an attachment for cultivators for destroying grass and weeds close to the plants without injuring the roots of the plants.

The invention consists in an attachment for cultivators constructed with a clamp secured to the standard of the cultivator, and holding the arm of a crank-rod, to the other end of which is secured a blade by a hook-bolt, whereby the said blade will be secured to the said standard, and can be readily adjusted, as will be hereinafter fully described.

A represents a beam, B the standards, C the braces, D a handle, and E the shovels, of a cultivator, about the construction of which parts there is nothing new.

To the lower part of the outer side of the plow-standard B is secured by bolts F and nuts G H the clamp I J. The inner part, I, of the clamp rests against the side of the standard B, and is secured in place by the inner nuts, G. The outer part, J, of the clamp rests against the inner part, I, and is secured in place by the outer nuts, H. The adjacent sides of the ends of the parts I J of the clamp are recessed or rabbeted to provide room for the nuts G. The ends of the parts I J of the clamp are slotted to receive the bolts F and allow the said clamp to be adjusted as may be required.

In the adjacent faces of the centers of the parts I J of the clamp are formed semi-cylindrical grooves to receive the forward arm of the crank-rod K, the rear arm of which rests in a groove or depression in the side of the forward end of the blade L, where it is secured in place by the hook-bolt M, as shown in Figs. 1, 3, and 4. The blade L is made of steel, is about two inches wide at its forward end, four inches wide at its rear end, and twelve inches long, and is designed to be so adjusted as to run along the surface of the ground between the shovel E and the plants, so as to cut off and cover the grass and weeds close to the plants without injuring the roots of the said plants.

It will be understood that a blade, L, is to be attached to run on the inner side of each of the inner standards of a cultivator.

Having thus described my invention, I claim as new and desire to secure by Letters Patent—

1. An attachment for cultivators constructed substantially as herein shown and described, and consisting of the clamp I J, the bolts and nuts F G H, the crank-rod K, held by the said clamp, and the blade and hook-bolt L M, secured to the said crank-rod, to adapt the attachment to be secured to the standard of a cultivator, as set forth.

2. The combination, with the standard B, of the clamp I J, the bolts and nuts F G H, the crank-rod K, and the blade and hook-bolt L M, substantially as herein shown and described, whereby the said blade will be firmly secured to the said standard, and can be readily adjusted, as set forth.

FREDERICK ALBRECHT.

Witnesses:
 C. A. GUFFIN,
 Z. S. HILLS.